US011216162B2

United States Patent
Usui et al.

(10) Patent No.: US 11,216,162 B2
(45) Date of Patent: Jan. 4, 2022

(54) INFORMATION PROCESSING DEVICE, INFORMATION PROCESSING METHOD, AND RECORDING MEDIUM STORING PROGRAM

(71) Applicant: SHARP KABUSHIKI KAISHA, Sakai (JP)

(72) Inventors: Tomoya Usui, Sakai (JP); Tohru Nishikawa, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/061,181

(22) Filed: Oct. 1, 2020

(65) Prior Publication Data
US 2021/0103368 A1 Apr. 8, 2021

(30) Foreign Application Priority Data
Oct. 3, 2019 (JP) .............................. JP2019-183062

(51) Int. Cl.
*G06F 3/0484* (2013.01)
*G09G 5/14* (2006.01)
*G09G 5/37* (2006.01)
*G06F 3/0481* (2013.01)

(52) U.S. Cl.
CPC ........ *G06F 3/0484* (2013.01); *G06F 3/04817* (2013.01); *G09G 5/14* (2013.01); *G09G 5/37* (2013.01); *G06F 2203/04804* (2013.01)

(58) Field of Classification Search
CPC ............... G06F 3/0484; G06F 3/04817; G06F 2203/04804; G06F 3/048; G09G 5/14; G09G 5/37
See application file for complete search history.

(56) References Cited

U.S. PATENT DOCUMENTS

| 5,742,286 A | * | 4/1998 | Kung .................... G06F 3/0486 715/733 |
| 6,340,967 B1 | * | 1/2002 | Maxted ............... G06F 3/04883 345/156 |
| 6,344,864 B1 | | 2/2002 | Watanabe |
| 2010/0257482 A1 | * | 10/2010 | Lyons ................... G06F 3/0486 715/794 |
| 2013/0031484 A1 | * | 1/2013 | Kluttz ................... G06F 3/0481 715/748 |
| 2016/0360012 A1 | * | 12/2016 | Zholudev ................ H04L 67/20 |
| 2017/0228291 A1 | * | 8/2017 | Mokhtarzada ...... G06F 11/1451 |

FOREIGN PATENT DOCUMENTS

| JP | H11-045164 A | 2/1999 |
| JP | 2014-026656 A | 2/2014 |

* cited by examiner

*Primary Examiner* — Jeanette J Parker
(74) *Attorney, Agent, or Firm* — ScienBiziP, P.C.

(57) ABSTRACT

In the present invention, a user selects a transfer process with respect to transfer target data being displayed in a first display area (window), which is the transfer source. At this point, a display processor of the information processing device, for example, changes the display mode so that the first display area is hidden except for the transfer target data. When the user specifies a second display area (window) as the transfer destination, a data processor executes the transfer process of the data to the second display area.

12 Claims, 15 Drawing Sheets

INFORMATION PROCESSING DEVICE, INFORMATION PROCESSING METHOD, AND RECORDING MEDIUM STORING PROGRAM

BACKGROUND OF THE INVENTION

Field of the Invention

The present invention relates to an information processing device, an information processing method, and a program that, when an operation is performed to transfer data from an transfer source display area to another display area, enable a transfer destination display area to be displayed with priority by changing the display mode of the transfer source display area.

Description of the Background Art

In information processing devices such as personal computers, smartphones, and tablets, data transfer operations (such as cut and copy) are performed by displaying windows, which are display areas. At this time, the process of finding a transfer destination display area is carried out while still displaying a transfer source display area, inside which the data is stored. However, the display area of the display device itself is limited, and it is difficult to ensure that the display will allow easy operation of a plurality of display areas.

Therefore, Japanese Unexamined Patent Application Publication No. H11-45164 describes an invention in which a plurality of windows is displayed on a display screen, and a transfer source window is displayed smaller when a transfer destination file is specified.

Furthermore, Japanese Unexamined Patent Application Publication No. 2014-26656 describes an invention in which two windows are opened in a web browser, and a cooperative operation can be performed between the windows, such as copying to a folder displayed in an item list in one of the windows.

However, in the inventions described in the patent documents above, the windows of the original display areas remain displayed. Although this is not a problem if the overall display area is sufficiently large such that the plurality of windows can be displayed without overlapping, the overall display area of the display unit in notebook computers, tablets, and smartphones is small. Therefore, the space becomes insufficient when a plurality of windows is opened, and large portions of the windows overlap. Consequently, it is necessary for the user to perform an operation that displays the window being operated at the front, or to move or close windows to improve the visibility. This results in poor usability.

Furthermore, the data being displayed as icons and the like inside the display areas remain unchanged before and after an operation. Therefore, it is not possible to grasp what type of operation instruction is being carried out.

The present invention has been made in view of such circumstances, and has an object of providing an information processing device, an information processing method, and a recording medium that stores a program that changes the display mode of a transfer source display area so that the transfer destination display area is easy to operate when performing a data transfer.

Moreover, the present invention has an object of providing an information processing device, an information processing method, and a recording medium that stores a program which enables a user to easily confirm the type of transfer process being performed, and further, to know whether the process can be executed.

SUMMARY OF THE INVENTION

The present invention is an information processing device capable of displaying a plurality of display areas when performing a data transfer, including a first display area showing a data transfer source, and a second display area showing a data transfer destination, the information processing device comprising:

a display processor that changes a display mode of the first display area when a transfer process is specified, and causes another display area to be displayed with priority; and a data processor that executes processing with respect to transfer target data being displayed in the first display area on the basis of the specified transfer process when the second display area is specified as a transfer destination.

Here, the display processor, for example, hides the first display area except for the transfer target data, displays only an outline of the first display area except for the transfer target data, semi-transparently displays the first display area except for the transfer target data, or displays only a title bar of the first display area except for the transfer target data.

Furthermore, the display processor, for example, displays the data displayed in the display area as an icon, or displays the name of the data displayed in the display area.

Moreover, for example, when a transfer process is specified, the display processor changes the icon to a display mode that indicates the transfer process, changes the pointer to a display mode that indicates the transfer process, or changes at least one of the first display area and the second display area to a display mode that indicates the transfer process.

Also, the display processor displays a message indicating that a data transfer is currently being performed when an operation other than a transfer process is performed.

In addition, the display processor, in the case of a data cut process, displays the transfer target data in the first display area in a different mode to an original state for a prescribed time after process execution by the data processor.

Furthermore, the present invention is an information processing method capable of displaying a plurality of display areas when performing a data transfer, including a first display area showing a data transfer source, and a second display area showing a data transfer destination, the method comprising:

changing a display mode of the first display area when a transfer process is specified, and causing another display area to be displayed with priority; and executing processing with respect to transfer target data being displayed in the first display area on the basis of the specified transfer process when the second display area is specified as a transfer destination.

Furthermore, the present invention is a recording medium that stores a program for causing a computer to execute the information processing method according to claim 15.

In the present invention, the display mode of the first display area, which is the transfer source, is changed so that the other display areas are displayed with priority. Therefore, it is not necessary for the user to close or move the transfer source window for easy operation. Further, the ease of use is greatly improved because the window does not interfere with subsequent operations.

Furthermore, in the present invention, by changing the display mode of the display areas, icons, and pointer to a display mode that indicates the transfer process, the user is able to easily recognize which type of transfer process has been selected.

Moreover, in the present invention, by notifying the user that a transfer to the transfer destination is not possible, the user can be notified of what has occurred and can be prompted for the next action.

DESCRIPTION OF THE PREFERRED EMBODIMENTS

Hereinafter, embodiments of the present invention will be described with reference to the attached drawings.

First Embodiment

Hereinafter, a first embodiment of the present invention will be described with reference to the drawings.

Figure 1:
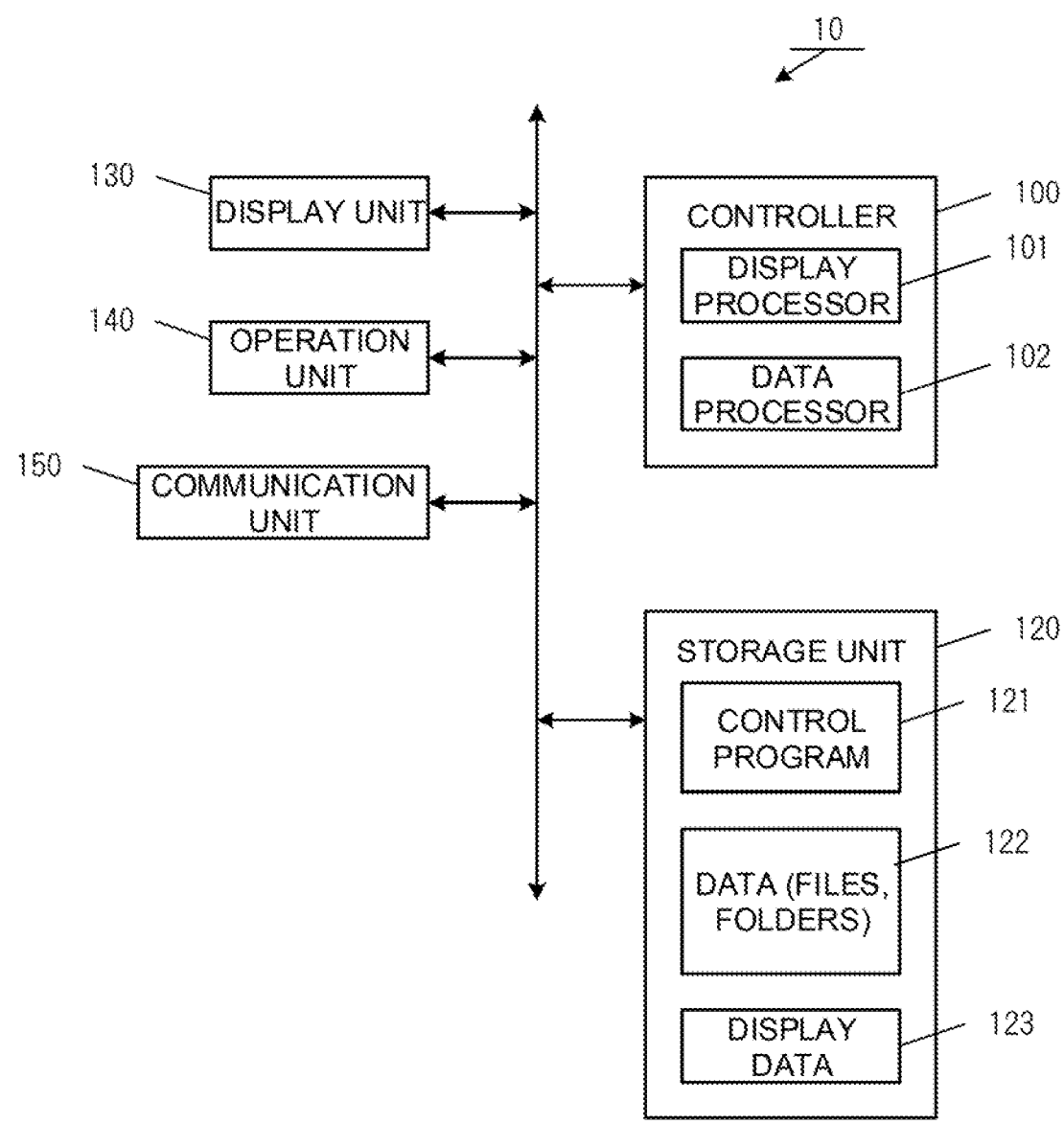
FIG. 1 is a block diagram showing a configuration of an information processing device according to a first embodiment of the present invention.

FIG. 1 is a block diagram showing a configuration of an information processing device according to a first embodiment of the present invention.

Figure 2:
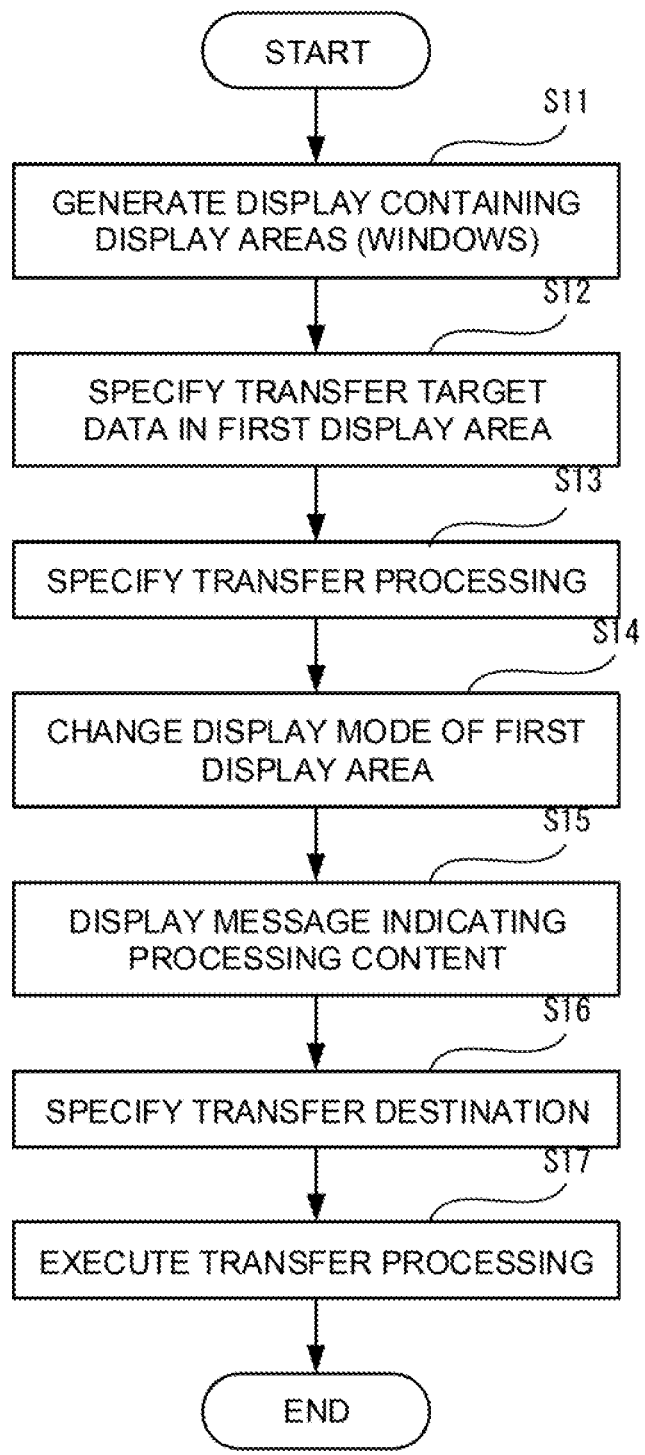
FIG. 2 is a flowchart showing a display process of the information processing device according to the first embodiment of the present invention.
Figure 3:
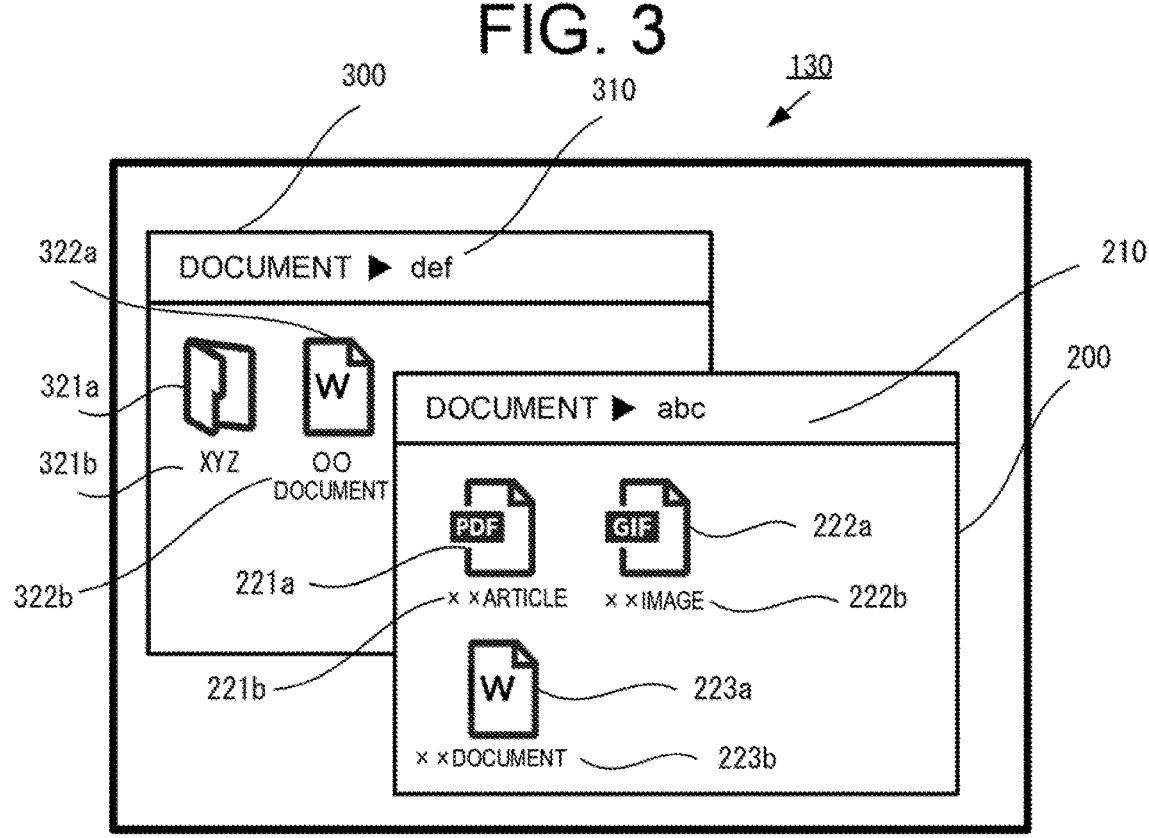
FIG. 3 is an explanatory diagram showing a display area displayed on a display unit of the information processing device according to the first embodiment of the present invention.
Figure 4:
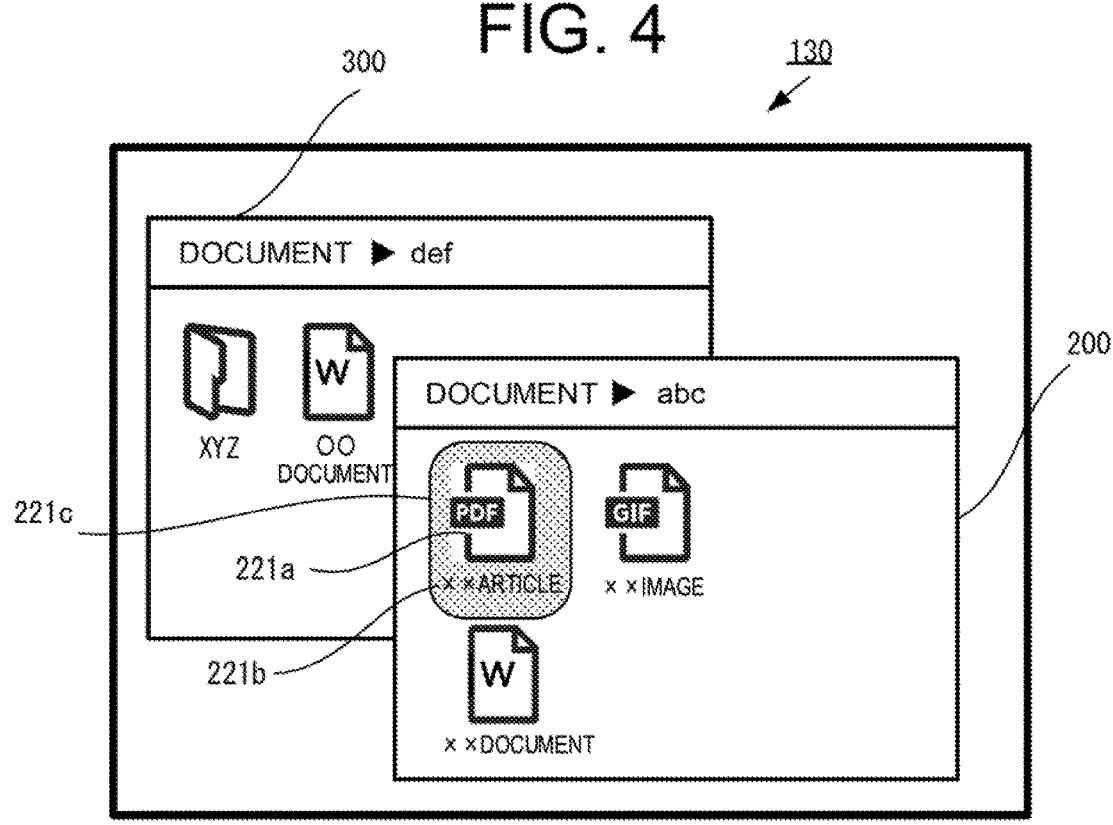
FIG. 4 is an explanatory diagram showing a transfer target file icon in a first display area displayed on the display unit of the information processing device according to the first embodiment of the present invention.
Figure 5:
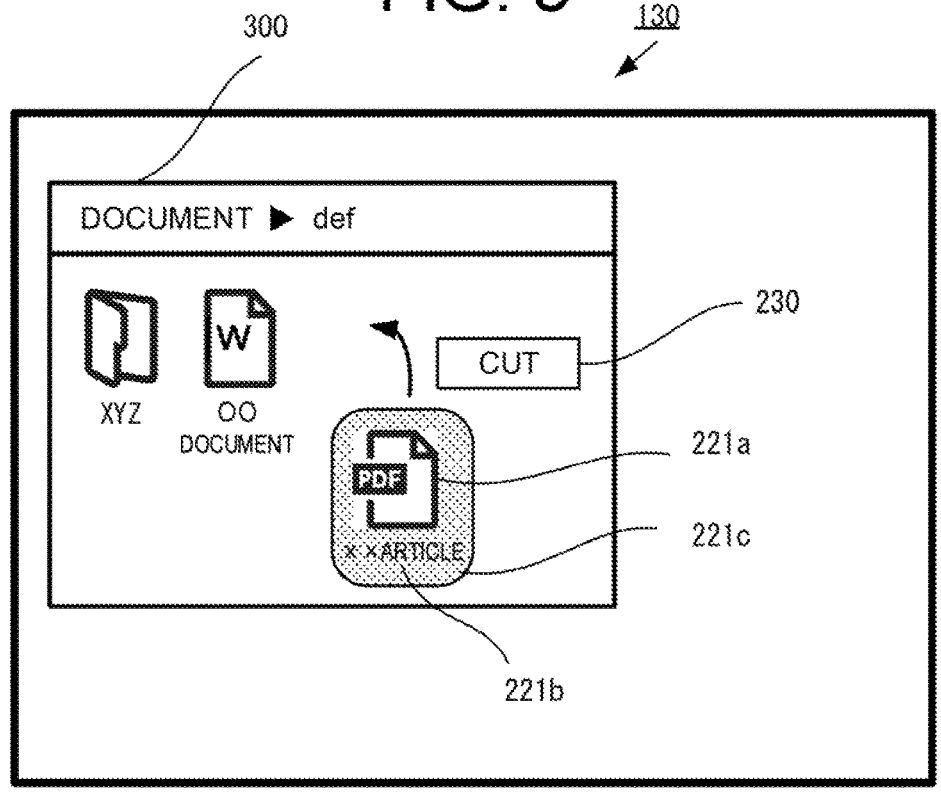
FIG. 5 is an explanatory diagram showing a case where the first display area displayed on the display unit of the information processing device is hidden according to the first embodiment of the present invention.
Figure 6:
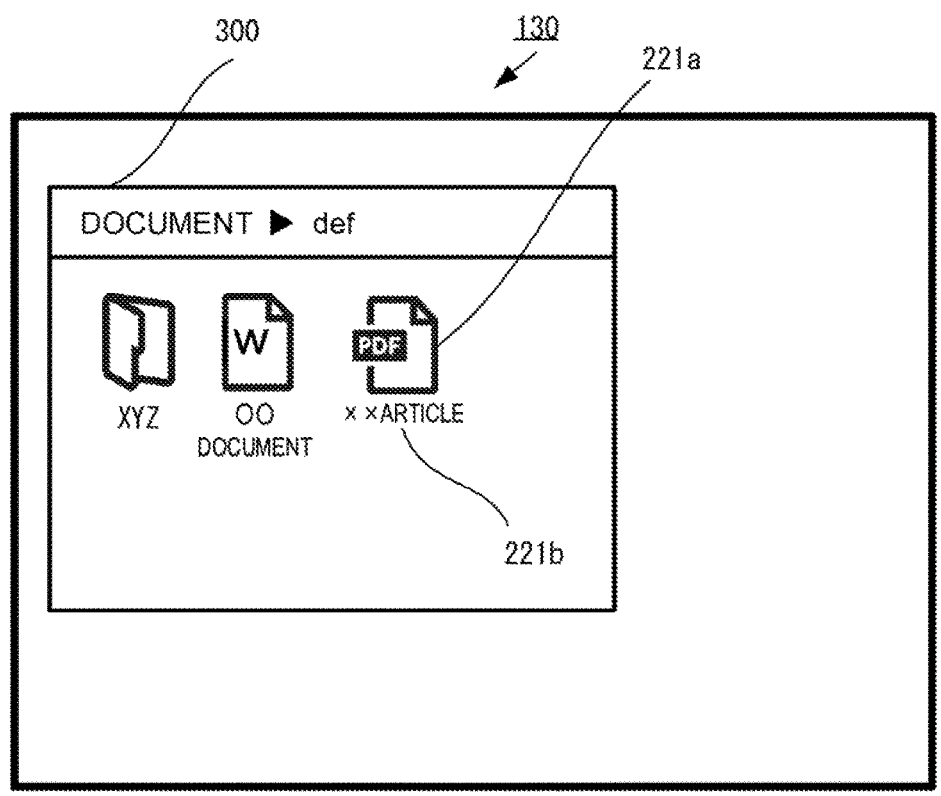
FIG. 6 is an explanatory diagram showing a case where a transfer process is performed when the first display area displayed on the display unit of the information processing device is hidden according to the first embodiment of the present invention.
Figure 7:
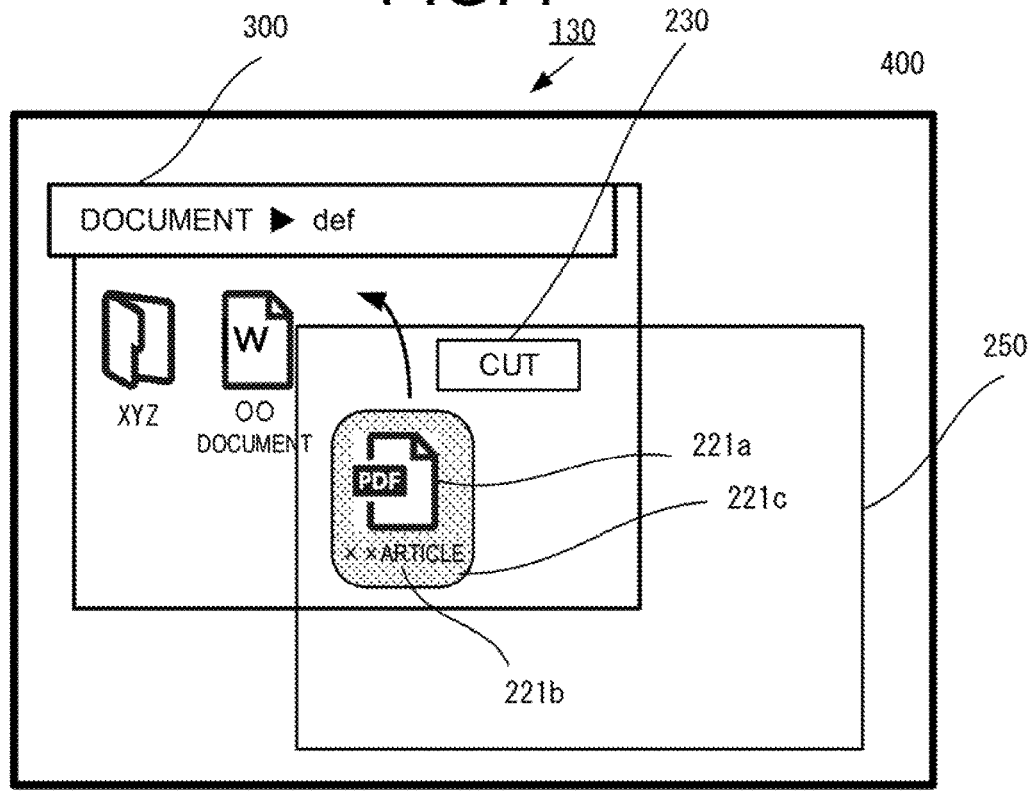
FIG. 7 is an explanatory diagram showing a case where an outline of the first display area is displayed on the display unit of the information processing device according to the first embodiment of the present invention.
Figure 8:
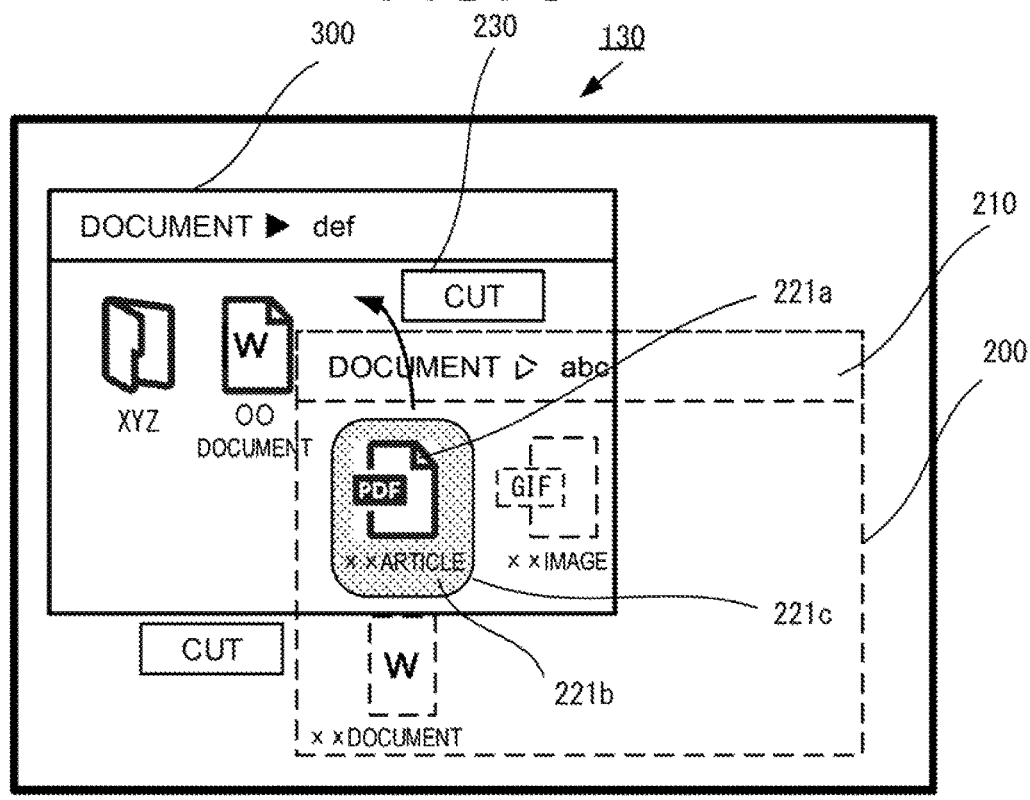
FIG. 8 is an explanatory diagram showing a case where the first display area is semi-transparently displayed on the display unit of the information processing device according to the first embodiment of the present invention.
Figure 9:
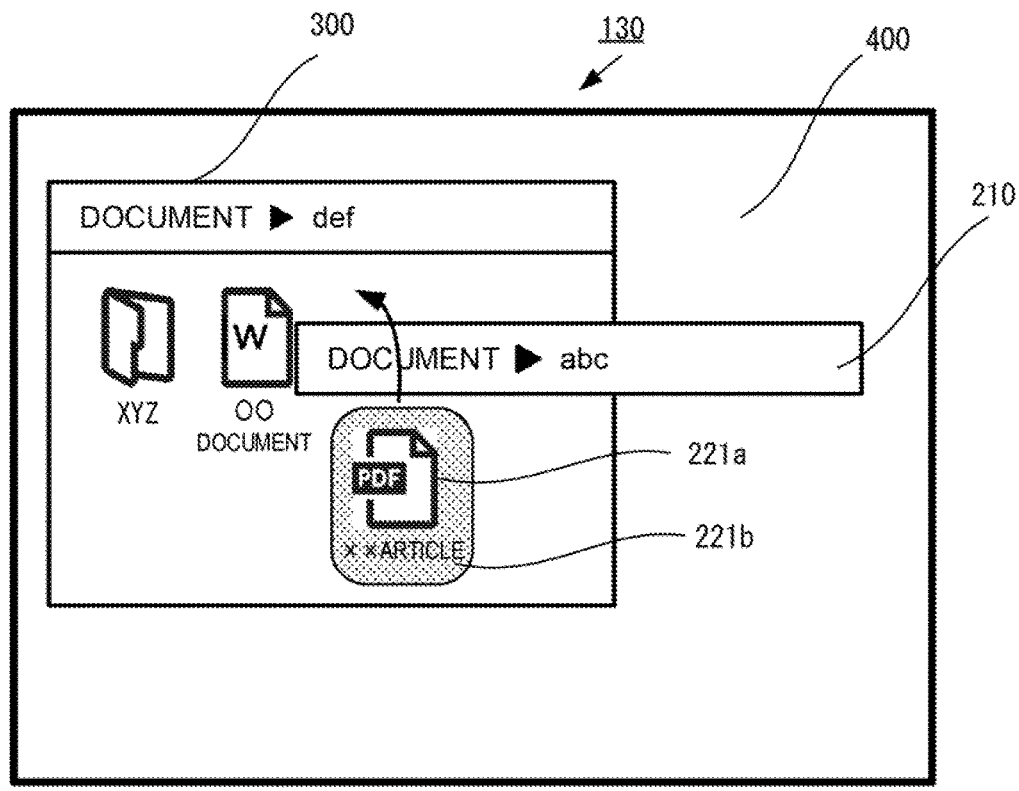
FIG. 9 is an explanatory diagram showing a case where a title bar of the first display area is displayed on the display unit of the information processing device according to the first embodiment of the present invention.
Figure 10:
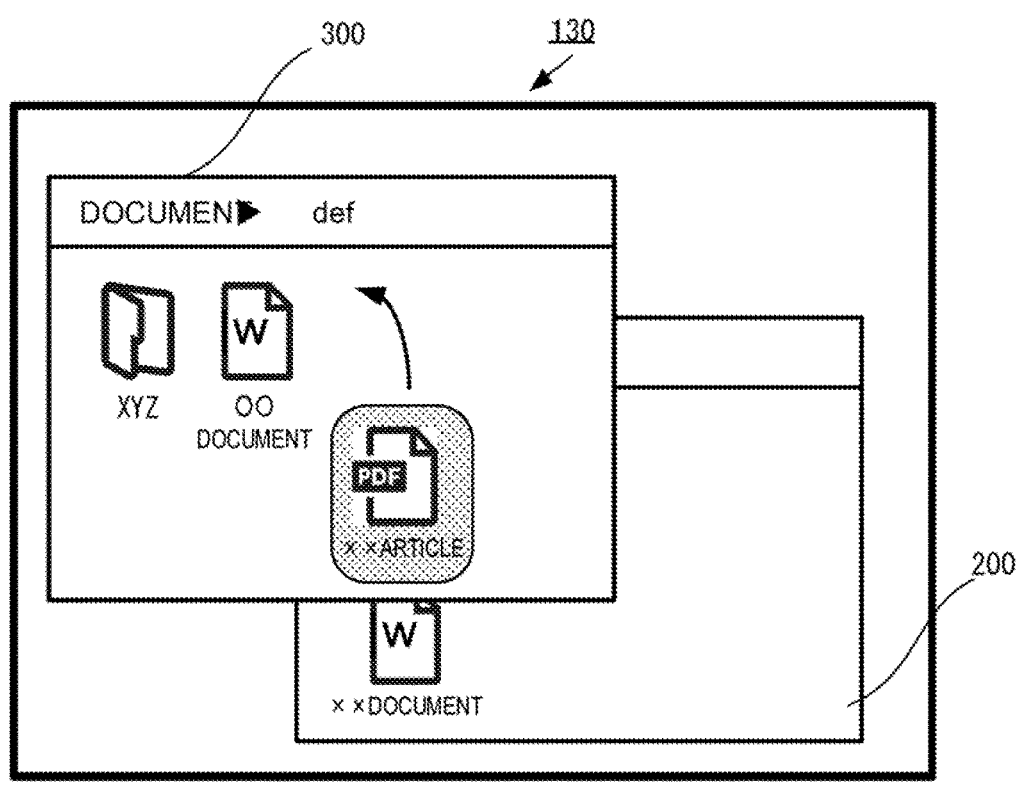
FIG. 10 is an explanatory diagram showing a case where the first display area is displayed behind a second display area on the display unit of the information processing device according to the first embodiment of the present invention.

FIG. 2 is a flowchart showing a display process of the information processing device. FIG. 3 is an explanatory diagram showing a display area displayed on a display unit of the information processing device. FIG. 4 is an explanatory diagram showing a transfer target file icon in a first display area displayed on the display unit of the information processing device. FIG. 5 is an explanatory diagram showing a case where the first display area displayed on the display unit of the information processing device is hidden. FIG. 6 is an explanatory diagram showing a case where a transfer process is performed when the first display area displayed on the display unit of the information processing device is hidden. FIG. 7 is an explanatory diagram showing a case where an outline of the first display area is displayed on the display unit of the information processing device. FIG. 8 is an explanatory diagram showing a case where the first display area is semi-transparently displayed on the display unit of the information processing device. FIG. 9 is an explanatory diagram showing a case where a title bar of the first display area is displayed on the display unit of the information processing device. FIG. 10 is an explanatory diagram showing a case where the first display area is displayed behind a second display area on the display unit of the information processing device.

Overall Description

The information processing device 10 of the first embodiment is a personal computer, a tablet, a smartphone, or the like. Specifically, it is intended to be an information processing device with a display unit whose display size is not large, and which overlappingly displays a plurality of windows (display areas). Furthermore, it can also be applied to a display of an operation panel on a device such as image forming device.

In the first embodiment, as shown in FIG. 3, a plurality of windows (display areas) are displayed, and two windows are overlappingly displayed in the display unit 130. The two windows display icons of the files and folders that are stored inside the folders. Although two windows are displayed here, it is possible for three or more windows to be displayed.

In first embodiment, when a transfer process (such as a cut or copy) is performed to transfer a transfer target file or folder to a window showing a transfer destination folder, the display mode of the transfer source window is changed so that it does not become an obstruction, and the transfer destination window is displayed with priority so that the process is more easily performed by the user.

Functional Configuration

As shown in FIG. 1, the information processing device 10 includes a controller 100, a storage unit 120, a display unit 130, an operation unit 140, and a communication unit 150.

The controller 100 is a functional unit for controlling the information processing device 10 as a whole. The controller 100 realizes various functions by reading and executing a control program 121 stored in the storage unit 120, and is configured by one or more computation devices (for example, a CPU (Central Processing Unit)).

The controller 100 includes a display processor 101 and a data processor 102.

The display processor 101 performs a display process with respect to the display unit 130, and generates and displays windows (display areas), icons, and a pointer according to the display data 123 of the storage unit 120.

The data processor 102 executes transfer processes such as cut or copy with respect to files and folders specified by the user from the operation unit 140.

The storage unit 120 is a functional unit that stores programs and data. The storage unit 120 is configured by, for example, a semiconductor memory such as an SSD (Solid State Drive), or an HDD (Hard Disk Drive).

The storage unit 120 stores a control program 121, data 122, and display data 123.

The control program 121 is a program that controls the processing performed by each unit.

The data 122 is stored in the form of data files, folders, which are a collection of data files, and the like. A folder has a hierarchical structure, in which each folder stores files and folders.

The display data 123 is data for displaying icons and a pointer and the like.

The display unit 130 displays various states of the information processing device 10, and displays the state of application operation inputs. It is configured by, for example, a liquid crystal display (LCD) or an organic EL panel.

The display unit 130 is assumed to be provided in the information processing device 10. However, it may be a display device which is separate from the information processing device.

The operation unit 140 is a button or switch or the like that accepts operation inputs from the user. The operation unit 140 may be realized by a hardware input device such as a switch, a keyboard, or a pointing device such as a mouse. It may also be realized by a touch panel or the like which is integrally formed with the display unit 130. In this case, the method of detecting inputs to the touch panel may be a general detection method such as a resistance film method, an infrared method, an electromagnetic induction method, or a capacitance method.

The communication unit 150 communicates with other devices via a network. For example, the communication unit 150 has an interface which is connectable to a network, and is capable of communicating with other devices via a wired/wireless LAN (Local Area Network). Note that image data may be transmitted to, and received from, other devices (such as a USB memory) via a USB (Universal Serial Bus) interface or the like.

Display Process

Next, the display process of the first embodiment above will be described based on FIG. 2.

The user operates the operation unit 140 of the information processing device 10, and displays a first display area (window) showing the content of the transfer source folder, and a second display area (window) showing the content of the transfer destination folder (step S11). Although two display areas are displayed here, additional display areas may be displayed for other necessary operations.

The user selects and specifies the target data to be subjected to the transfer process from the first display area using the operation unit 140. As a result, the data processor 102 of the information processing device 10 specifies the transfer target data (step S12).

Then, the user selects and specifies the transfer process to be performed with respect to the transfer target data using the operation unit 140 (step S13). Transfer processes includes cut and copy, and one of these is selected and specified. The display processor 101 changes the display mode of the first display area, which is the transfer source, and displays the other display areas, including the second display area, with priority. There are various methods of changing the display mode, and these will be described in detail below.

Further, a message indicating the content of the transfer process is displayed near the file icon to notify the user of the content of the process (step S15).

The user specifies the second display area, which is the transfer destination, using the operation unit 140 (step S16). The data processor 102 executes the specified transfer process (step S17).

Change in Display Mode of First Display Area

There are various ways of changing the display mode of the first display area, and these will be described in detail below.

Initially, as shown in FIG. 3, two windows 200 and 300 are displayed on the display unit 130. These windows show the data stored inside each folder. The title bars 210 and 310 of the windows display the names of the folders being displayed, and may additionally display paths so that the locations of the displayed folders in the folder hierarchical structure can be understood.

The files and folders stored inside the folders are displayed as icons inside each window so that the file icons inside the window 200 can be recognized. Further, the names of the files and folders are displayed near the icons (below the icons in the drawing).

For example, from the title bar 210 of the window 200, it can be understood that the data files stored in the "abc" folder inside the "documents" folder are being displayed as icons inside the window 200. The file names 221b, 222b and 223b are displayed below the icons 221a, 222a and 223a, which represent files.

Furthermore, from the title bar 310 of the window 300, it can be understood that the data stored in the "def" folder inside the "documents" folder is being displayed as icons inside the window 300. The folder name 321b and the file name 322b are displayed below the icon 321a, which represents a folder, and the icon 322a, which represents a file.

The window 200 is the first display area, which represents the data transfer source. The window 300 is the second display area, which represents the data transfer destination. Although it is assumed here for simplicity that two display areas are displayed, three or more windows (display areas) may be displayed.

As shown in FIG. 4, the user specifies the file icon 221a in the window 200 as the transfer target file. The file icon 221a and the file name 221b form an active display 221c which indicates that the file is the transfer target.

Next, the user makes a transfer process selection. For example, although not illustrated, this can be an operation such as displaying a process operation menu and then making a selection. Although the transfer process can be a process such as cut or copy, it is assumed here that a cut process has been selected.

At this point, as shown in FIG. 5, the display processor 101 of the controller 100 of the information processing device 10 hides the window 200 except for the file icon 221, which is the transfer target. Therefore, the icons 222a and 223a and the file names 222b and 223b are also hidden.

Next, a "cut" message 230 indicating the content of the transfer process is displayed near the file icon 221a. As a result, the user is able to confirm the content of the transfer process.

Then, the user uses the operation unit 140 to perform a drag-and-drop operation of the file icon 221a into the window 300. As a result, the transfer destination of the file icon 221a is specified.

The data processor 102 of the controller 100 of the information processing device 10 executes a "cut" process, which is the transfer process. As shown in FIG. 6, the file icon 221a and the file name 221b are displayed in the window 300.

The display mode of the window 200 is not limited to the above, and includes other variations. The following will describe only the changes in the display mode.

As shown in FIG. 7, it is possible to display only the file icon 221a, which is the transfer target, and an outline 250 of the transfer source window 200. The outline 250 at this time may be thin, or displayed with a light color. Furthermore, in this case, although the icons other than that of the transfer target displayed in the window 200 are hidden, they may also be semi-transparently displayed.

As shown in FIG. 8, the window 200, which is the transfer source display area, and the file icons displayed in the window except for the file icon 221a, which is the transfer target, are made semi-transparent.

As shown in FIG. 9, it is also possible for the file icon 221a and the file name 221b in the window 200, and the title bar 210 of the transfer source window 200 to be displayed, and for the remaining items to be hidden. Furthermore, it is also possible for the file icon 221a and the file name 221b of the window 200, and the title bar 210 of the transfer source window 200 to be displayed, and for the remaining items to be semi-transparent.

As a result, because the title bar 210 of the transfer source window 200 is being displayed, when the transfer source folder is opened, the window 200 can be easily opened and processed by double-clicking inside the frame thereof.

As shown in FIG. 10, the window 200 may be placed behind the window 300. If additional windows are also being displayed, the window 200, which is the transfer source, is placed at the very back.

Modification of First Embodiment

Next, a modification of the first embodiment of the present invention will be described with reference to the drawings.

Figure 11:
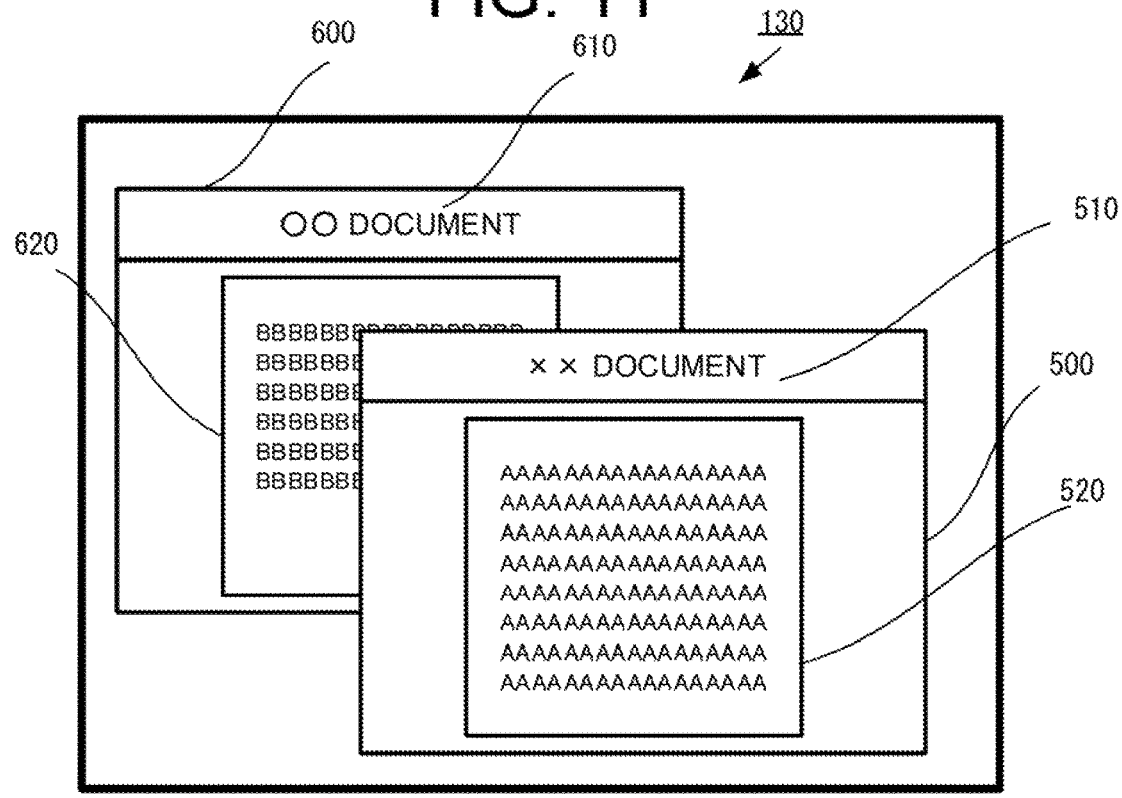
FIG. 11 is an explanatory diagram showing a display area displayed on the display unit of an information processing device according a modification of the first embodiment of the present invention.
Figure 12:
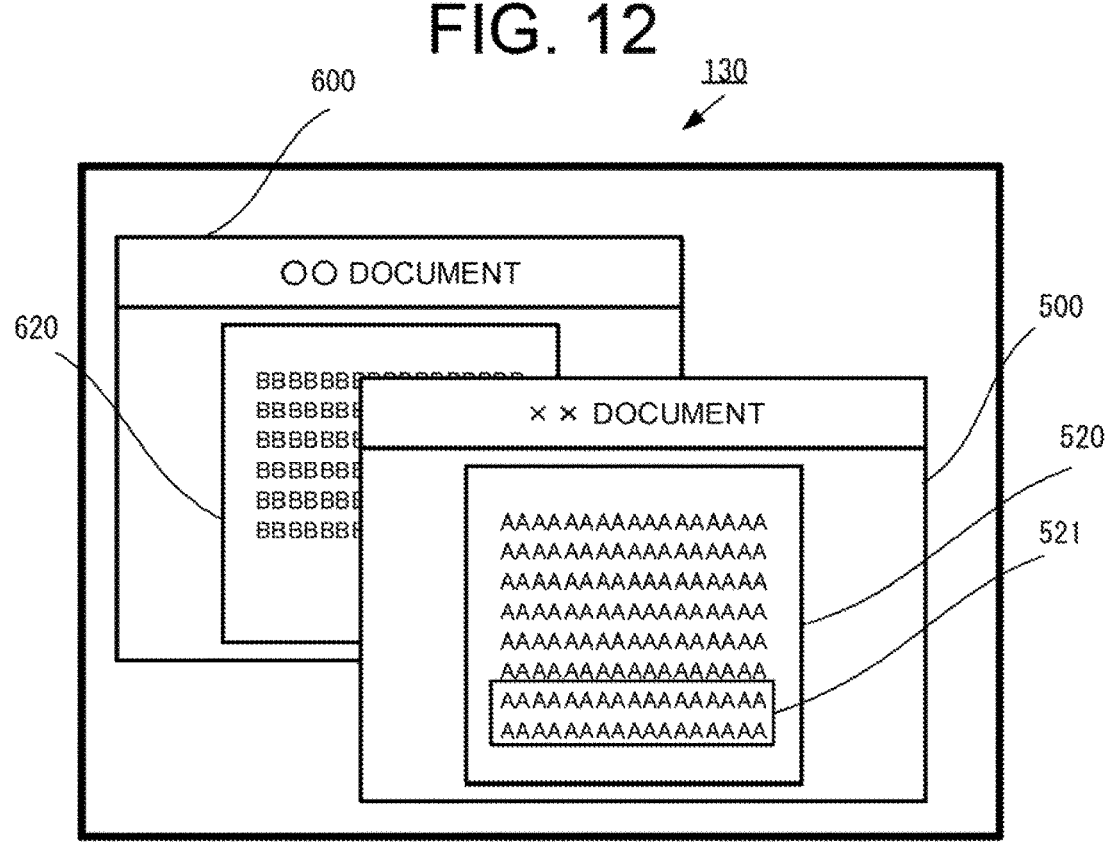
FIG. 12 is an explanatory diagram showing transfer target document data in the first display area displayed on the display unit of the information processing device according the modification of the first embodiment of the present invention.
Figure 13:
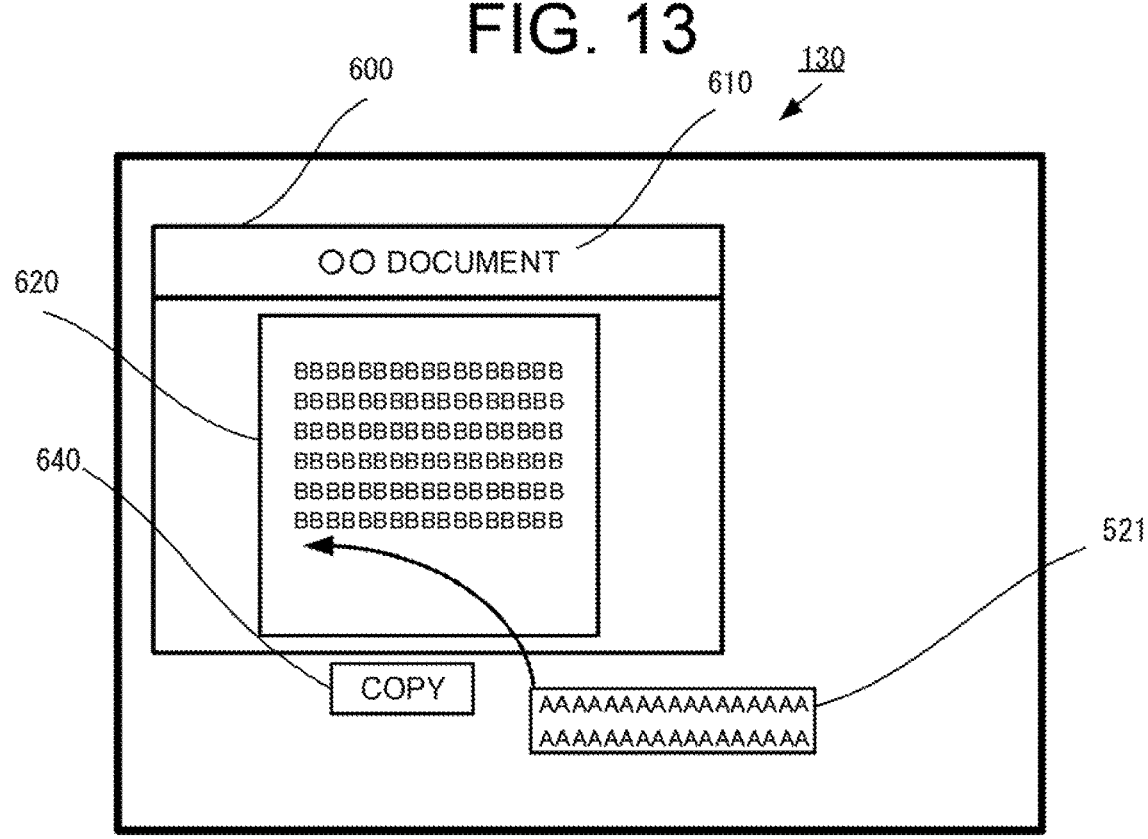
FIG. 13 is an explanatory diagram showing a case where the first display area displayed on the display unit of the information processing device is hidden according to the modification of the first embodiment of the present invention.
Figure 14:
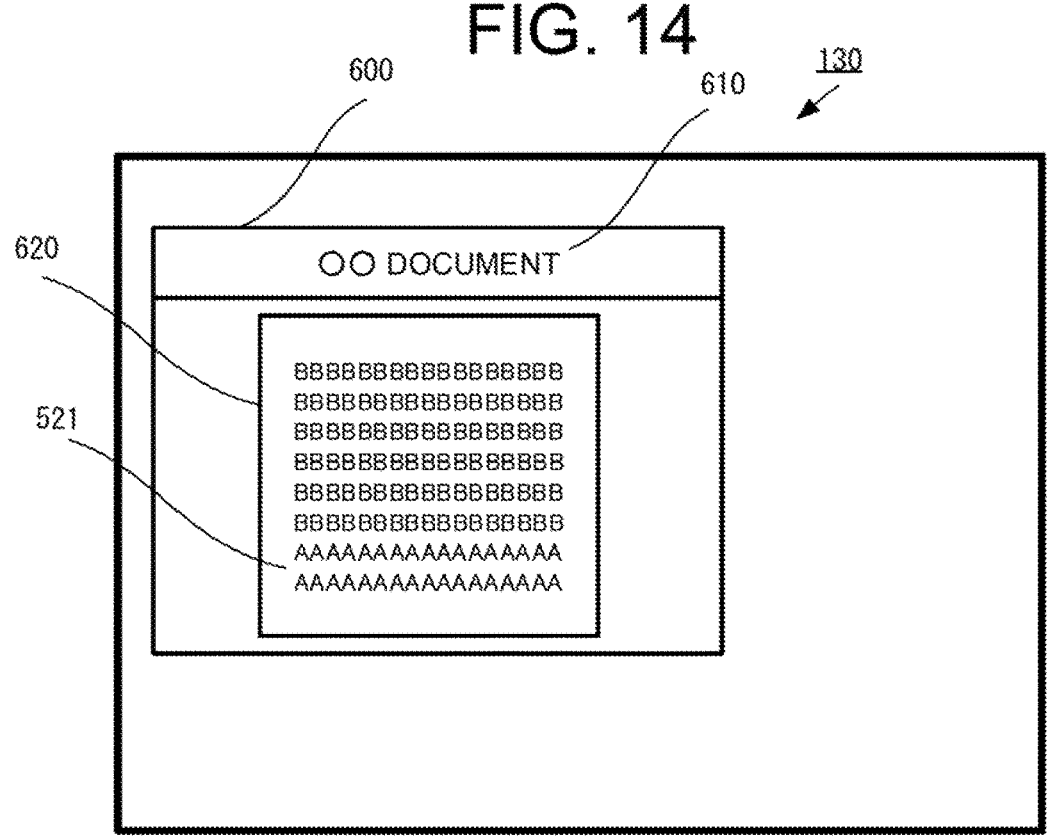
FIG. 14 is an explanatory diagram showing a case where a transfer process is performed when the first display area displayed on the display unit of the information processing device is hidden according to the modification of the first embodiment of the present invention.

FIG. 11 is an explanatory diagram showing a display area displayed on the display unit of an information processing device according a modification of the first embodiment of the present invention. FIG. 12 is an explanatory diagram showing transfer target document data in the first display area displayed on the display unit of the information processing device. FIG. 13 is an explanatory diagram showing a case where the first display area displayed on the display unit of the information processing device is hidden. FIG. 14 is an explanatory diagram showing a case where a transfer process is performed when the first display area displayed on the display unit of the information processing device is hidden.

Although the first embodiment relates to a transfer process of files and folders inside a folder, the same process is possible for the transfer of content data.

The windows serving as display areas shown in FIGS. 11 to 14 are windows that display content. In this modification, it is assumed that a transfer process is performed which transfers content data in one window to content data in another window.

As shown in FIG. 11, two windows are displayed on the display unit 130 of the information processing device 10, and each of the windows are displaying the contents of the content. In the windows 500 and 600, the content of a certain page of a document file is displayed by a document application as the document data 520 and 620. The document file names are displayed as "×× document" in the title bar 510 of the window 500, and as "∘∘ document" in the title bar 610 of the window 600.

The window 500 is the first display area showing the data transfer source. The window 600 is the second display area showing the data transfer destination. Although it is assumed here for simplicity that two display areas are displayed, three or more windows (display areas) may be displayed.

When the user uses the operation unit 140 to specify part of the document data 520 (bottom two lines) displayed in the window 500 as the transfer target data 521, that portion forms an active display which indicates that it is the transfer target.

Next, the user selects a transfer process. For example, although not illustrated, this can be an operation such as displaying a process operation menu and then making a selection. Although the transfer process can be a process such as cut or copy, it is assumed here that copy has been selected.

At this point, as shown in FIG. 13, the display processor 101 of the controller 100 of the information processing device 10 hides the window 200 except for the transfer target data 521. Therefore, the document data 520 other than the transfer target data 521 is also hidden.

Next, as shown in FIG. 13, a message 640 such as "copy" that indicates the operation is displayed at the transfer destination. As a result, the user is able to confirm which type of transfer process will be performed.

Then, the user uses the operation unit 140 to perform a drag-and-drop operation of the transfer target data 521 to the copy location of the document data 620 of the window 600. As a result, the transfer destination of the transfer target data 521 is specified.

The data processor 102 of the controller 100 of the information processing device 10 executes a "copy" process, which is the transfer process. As shown in FIG. 14, the transfer target data 521 is displayed in the window 600.

In addition to hiding the window 500 showing the transfer source, various types of changes to the display mode can be considered in a similar manner to the window 200 described above.

In this way, the display mode of the window at the very front is changed so that it does not interfere with subsequent operations made with respect to the transfer destination window 600. Therefore, it is not necessary for the user to close or move the transfer source window for convenient operation, which significantly improves ease of use.

Second Embodiment

Next, a second embodiment of the present invention will be described with reference to the drawings.

Figure 15:
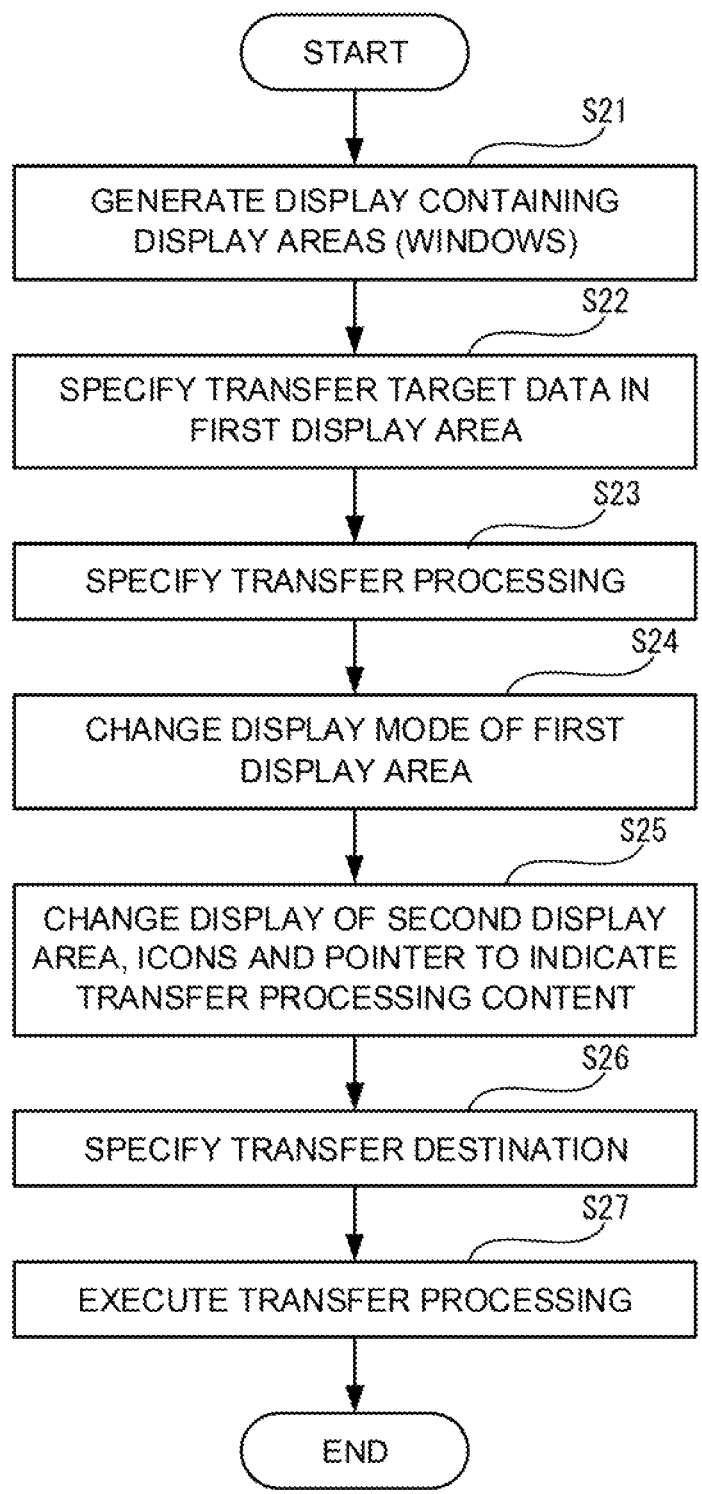
FIG. 15 is a flowchart showing a display process of an information processing device according to a second embodiment of the present invention.
Figure 16:
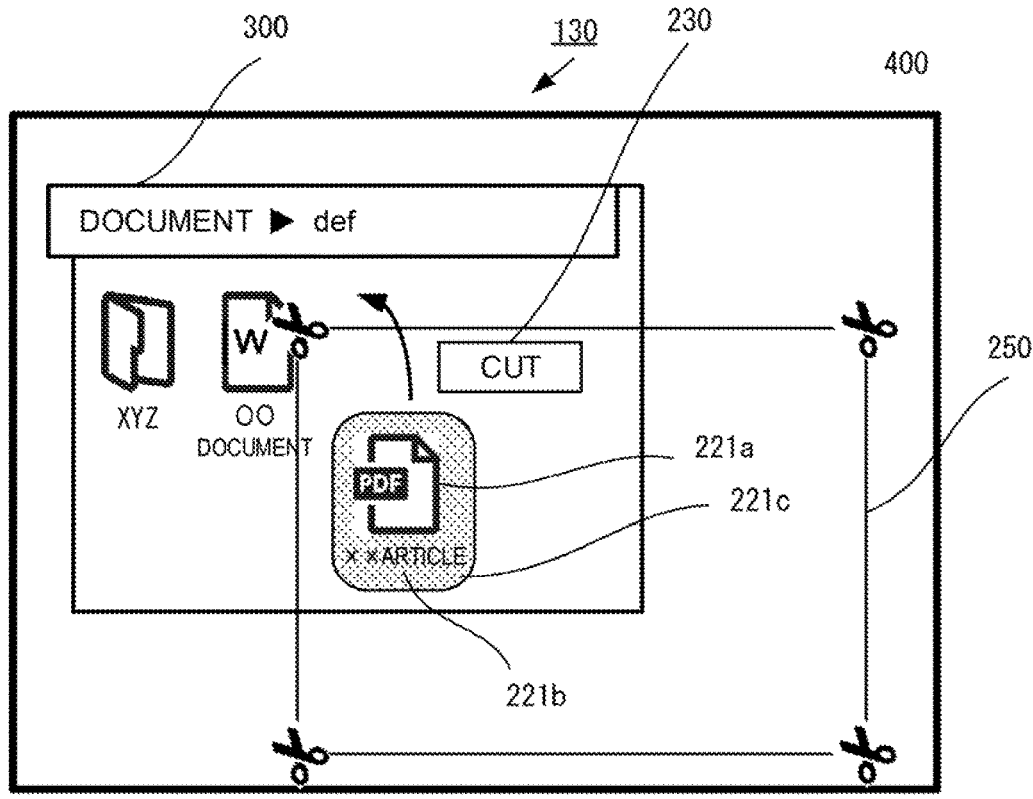
FIG. 16 is an explanatory diagram showing the first display area displayed after selection of a transfer process on the display unit of the information processing device according to the second embodiment of the present invention.
Figure 17:
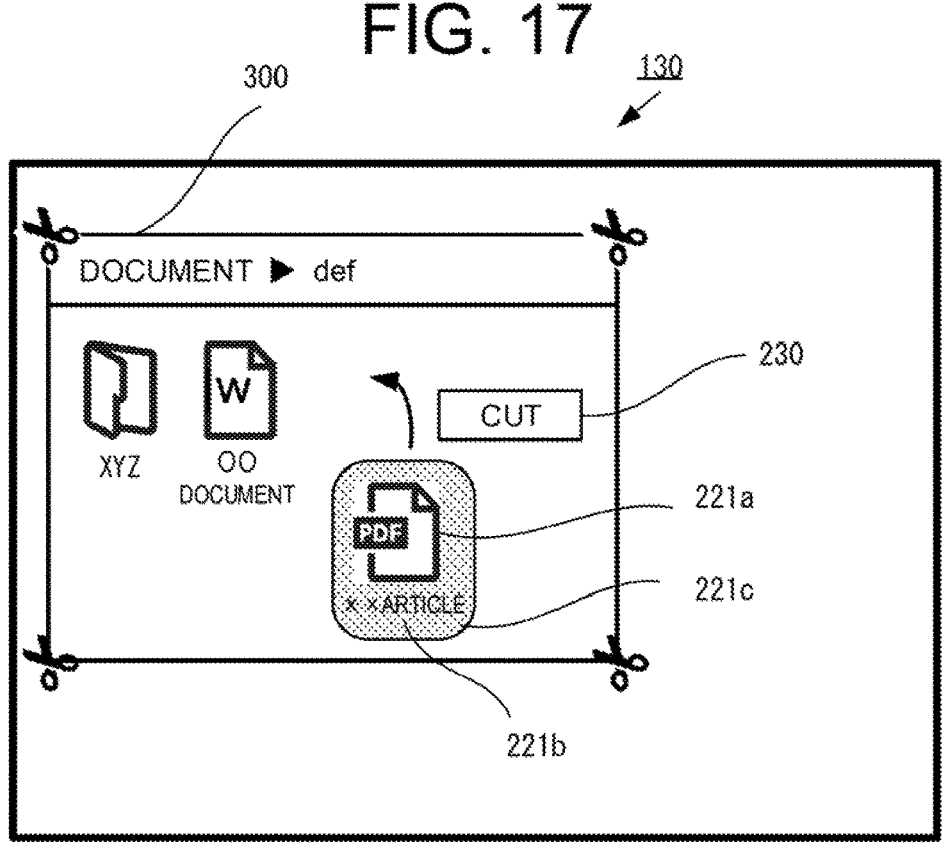
FIG. 17 is an explanatory diagram showing the second display area displayed after selection of a transfer process on the display unit of the information processing device according to the second embodiment of the present invention.
Figure 18:
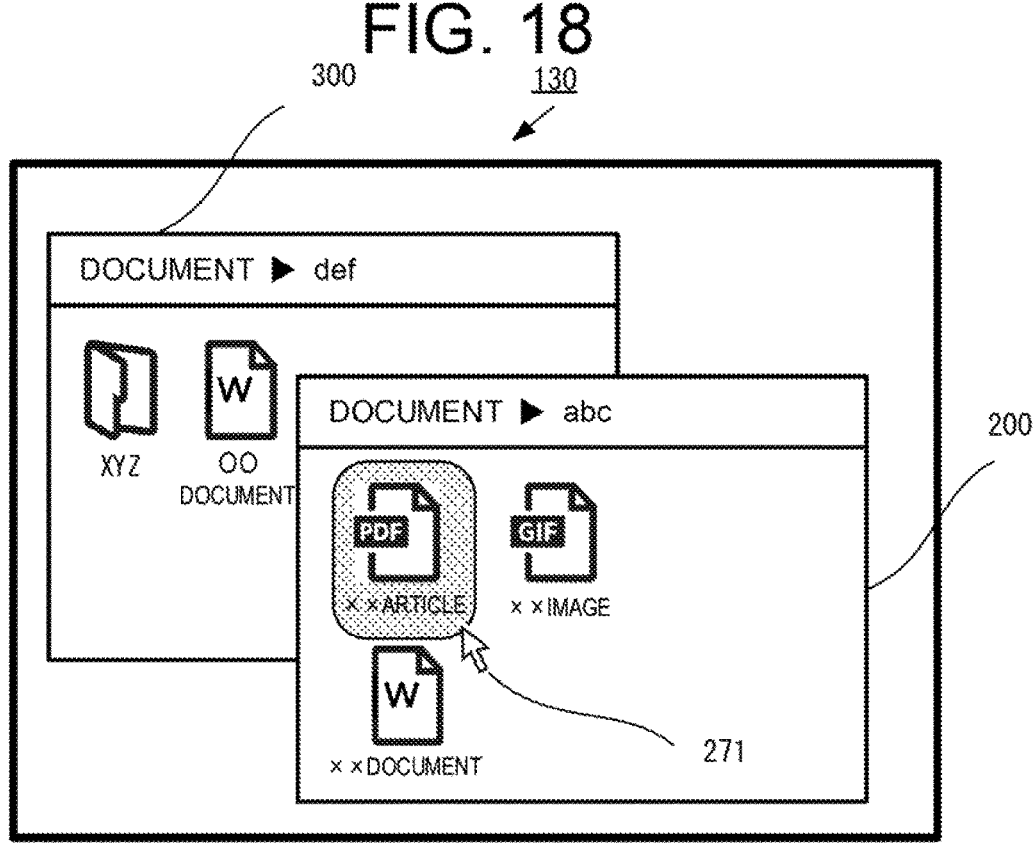
FIG. 18 is an explanatory diagram showing a pointer displayed before selection of a transfer process on the display unit of the information processing device according to the second embodiment of the present invention.
Figure 19:
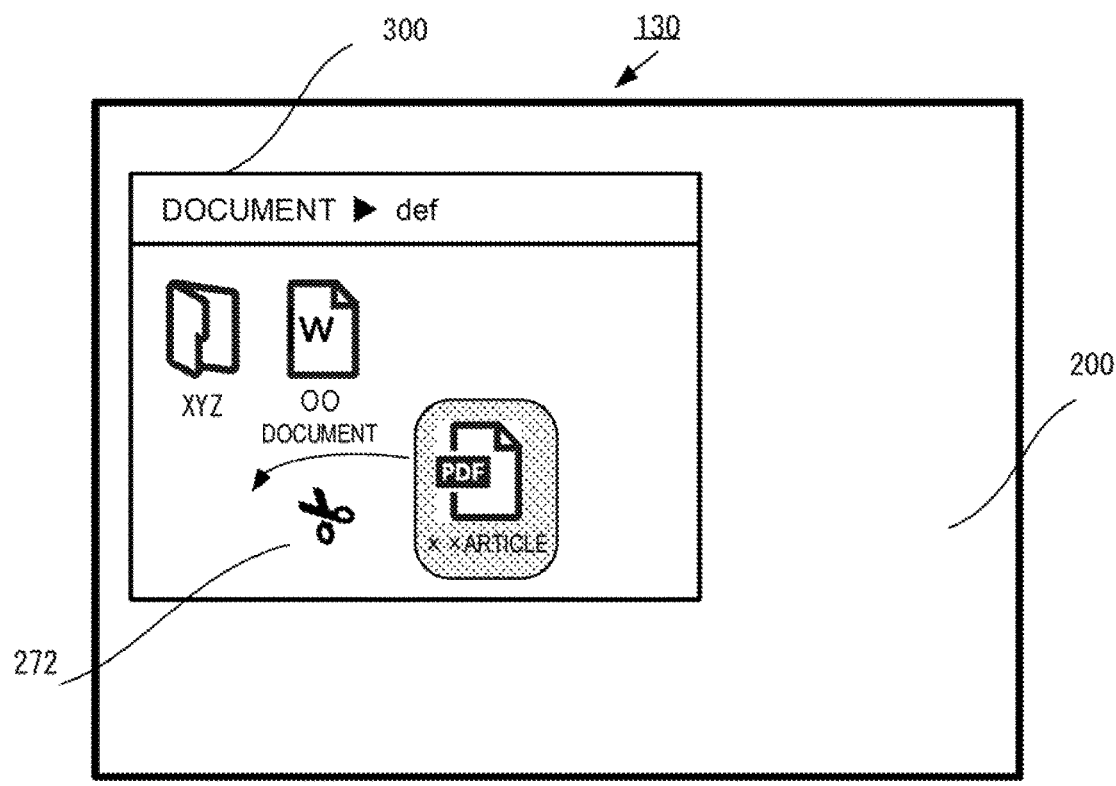
FIG. 19 is an explanatory diagram showing a pointer displayed after selection of a transfer process on the display unit of the information processing device according to the second embodiment of the present invention.
Figure 20:
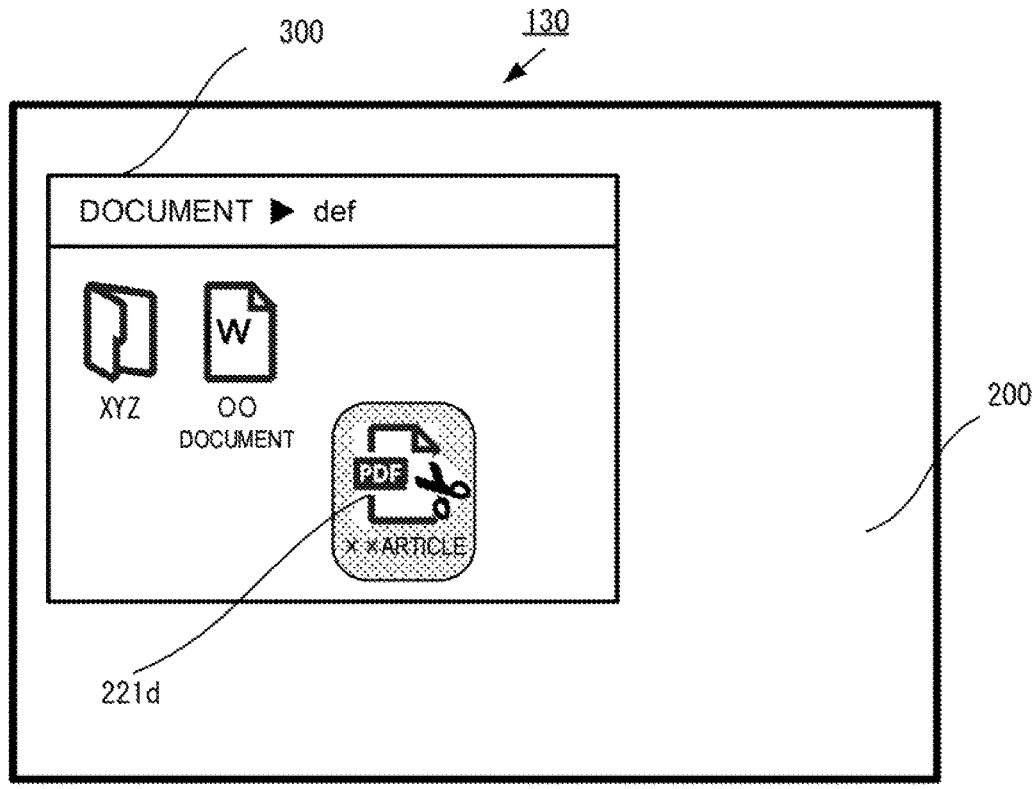
FIG. 20 is an explanatory diagram showing a file icon displayed after selection of a transfer process on the display unit of the information processing device according to the second embodiment of the present invention.
Figure 21:
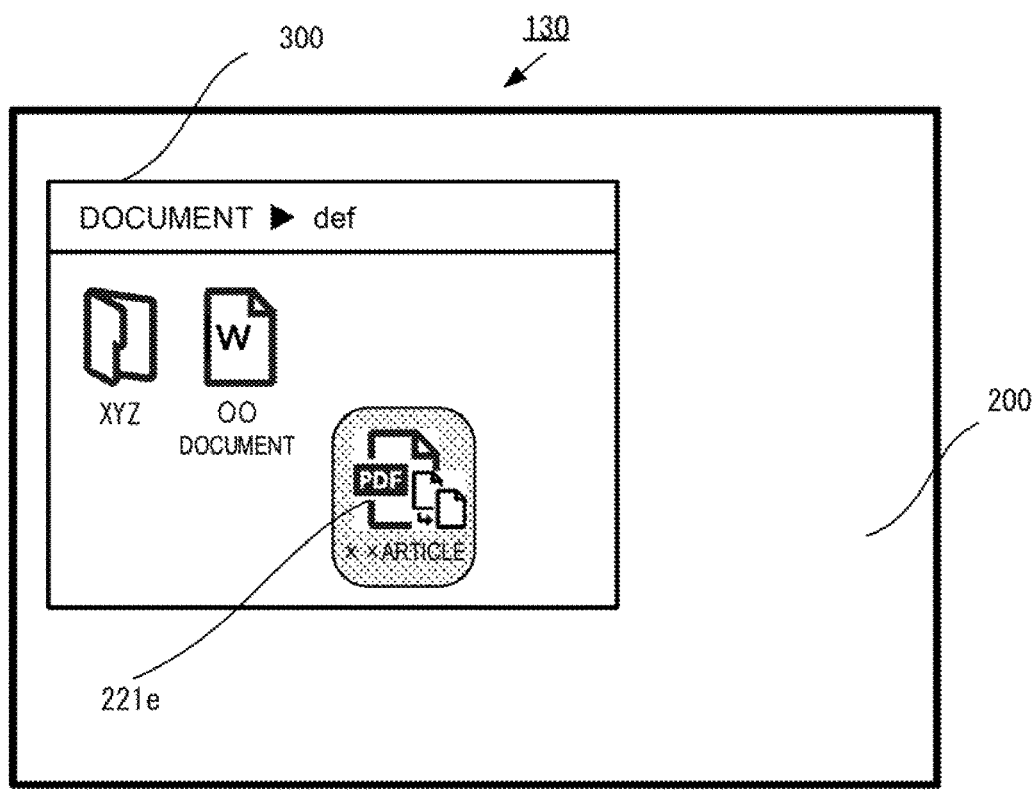
FIG. 21 is an explanatory diagram showing another file icon displayed after selection of a transfer process on the display unit of the information processing device according to the second embodiment of the present invention.

FIG. 15 is a flowchart showing a display process of an information processing device according to a second embodiment of the present invention. FIG. 16 is an explanatory diagram showing the first display area displayed after selection of a transfer process on the display unit of the information processing device. FIG. 17 is an explanatory diagram showing the second display area displayed after selection of a transfer process on the display unit of the information processing device. FIG. 18 is an explanatory diagram showing a pointer displayed before selection of a transfer process on the display unit of the information processing device. FIG. 19 is an explanatory diagram showing a pointer displayed after selection of a transfer process on the display unit of the information processing device. FIG. 20 is an explanatory diagram showing a file icon displayed after selection of a transfer process on the display unit of the information processing device. FIG. 21 is an explanatory diagram showing another file icon displayed after selection of a transfer process on the display unit of the information processing device.

Overall Description

The information processing device 10 of the second embodiment is the same in the respect that it changes the display mode of the transfer source window to prevent interference with the next operation. However, it also changes the pointer and icons so that the process content is more easily recognized by the user.

The functional configuration of the information processing device is the same as in the first embodiment shown in FIG. 1. Therefore, the description is omitted.

Display Process

Next, the display process of the second embodiment above will be described based on FIG. 15.

The display process of the second embodiment is substantially the same as the display process of the first embodiment shown in FIG. 2. Specifically, steps S21 to S23 and steps S26 and S27 are the same as steps S11 to S13 and steps S16 and S17. Therefore, the description is omitted.

In step S23, when the user selects and specifies the transfer process to be performed with respect to the transfer target data using the operation unit 140, the display mode of the first display area, which is the transfer source, is changed in step S24. In the first embodiment, the other display areas, including the second display area, are displayed with priority. However, it is possible to further change the display mode to indicate the transfer process.

In addition, the other display modes, the file icons, the pointer, and the like, are also changed to a display mode that indicates the transfer process (step S25). The user is notified of the transfer process in this manner.

In terms of display modes indicating the transfer process described above, it is possible to implement one form, combine several forms, or implement all of the forms.

Display Mode Indicating Transfer Process

Next, specific display modes of the display area, icons and pointer indicating the transfer process will be described.

As shown in FIG. 16, when an outline 250 of the window 200, which is the first display area, is displayed, a display mode is used in which a pair of scissors is placed at each of the four corners of the outline. This indicates that the transfer process is "cut".

For example, because a display such as that shown in FIG. 16 is not possible when the window 200 is hidden, the display mode of the display areas (windows) being displayed is changed. For example, as shown in FIG. 17, a display mode in which a pair of scissors is placed at each of the four corners of the outline is used with respect to the window 300, which is the second display area and represents the transfer destination. This indicates that the transfer process is "cut".

For example, when windows other than the window 300 are being displayed, it is not known which window will be selected as the transfer destination. Therefore, the display mode is changed for all of the windows being displayed.

Furthermore, when the transfer destination is specified, it is possible for the display mode of only the specified window to be kept in a changed form indicating the transfer process, and for the display mode of the other windows to be returned to the original form.

As shown in FIG. 18, before selection of the transfer process, the pointer 271 is displayed as an arrow. After selection of the transfer process, the pointer 272 shown in FIG. 19 is changed to a pair of scissors, indicating that the transfer process is "cut".

As shown in FIG. 5, the file icon 221a is displayed before selection of the transfer process. However, as shown in FIG. 20, this is changed to the file icon 221d after selection of the transfer process. A pair of scissors is displayed in the file icon 221d, which indicates that the transfer process is "cut".

A case where the transfer process is a cut process has been described above. However, in the case of a copy process, an image other than a pair of scissors is displayed. For example, as shown in FIG. 21, a copy process is indicated by adding an image other than a pair of scissors that indicates a copy process to the file icon 221e.

As described above, by changing the display mode of the display areas, icons, and pointer to a display mode that indicates the transfer process, the user is able to easily recognize which type of transfer process has been selected.

Third Embodiment

Next, a third embodiment of the present invention will be described with reference to the drawings.

Figure 22:
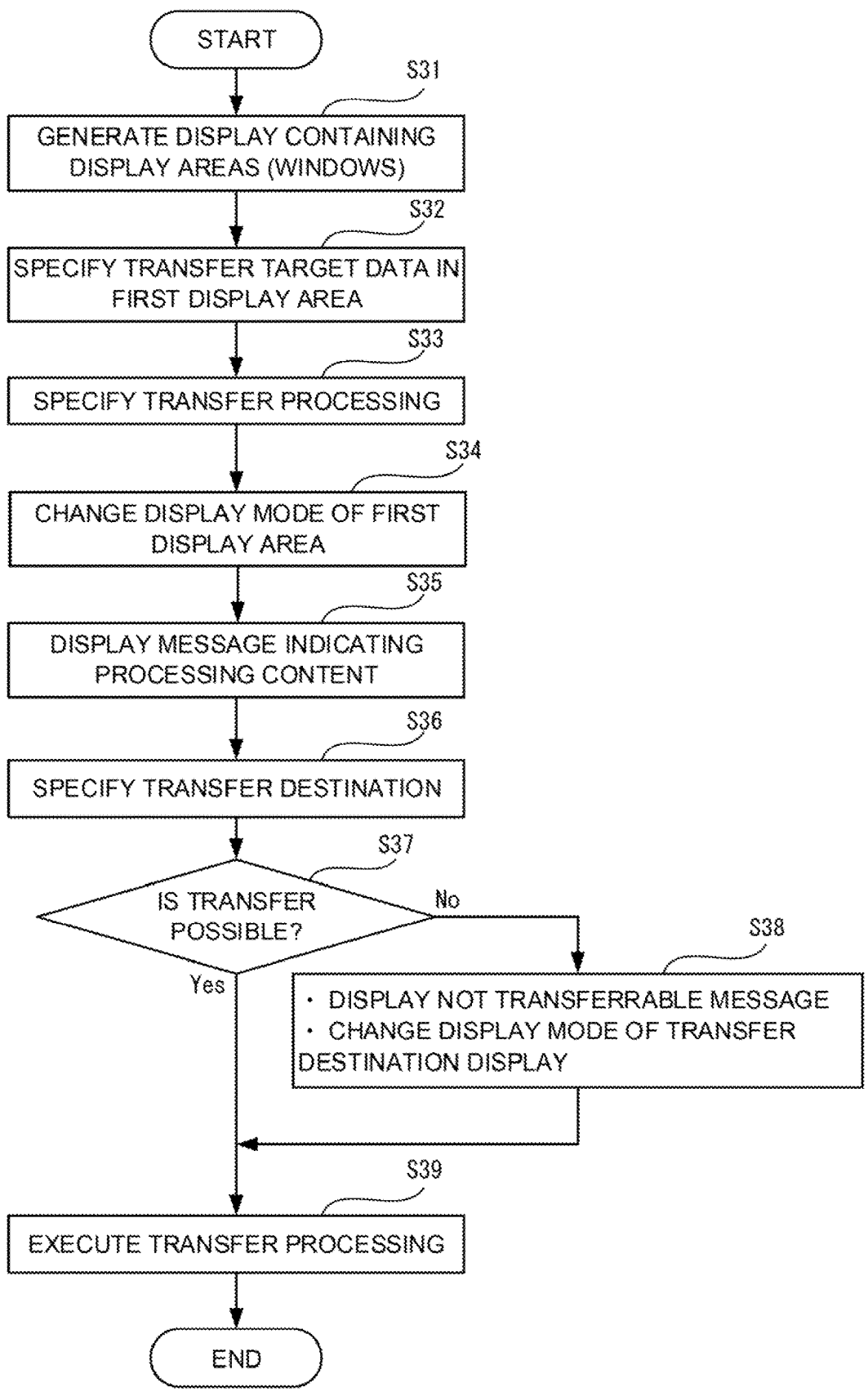
FIG. 22 is a flowchart showing a display process of an information processing device according to a third embodiment of the present invention.
Figure 23:
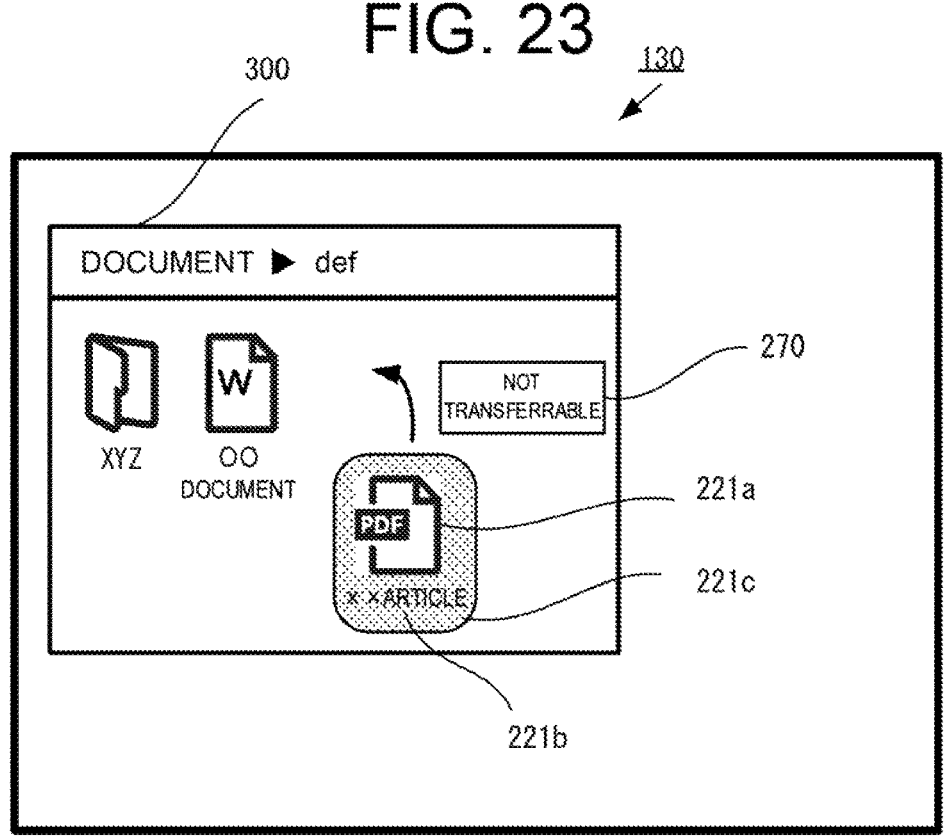
FIG. 23 is an explanatory diagram showing a not transferrable message near a transfer target file icon displayed on the display unit of the information processing device according to the third embodiment of the present invention.
Figure 24:
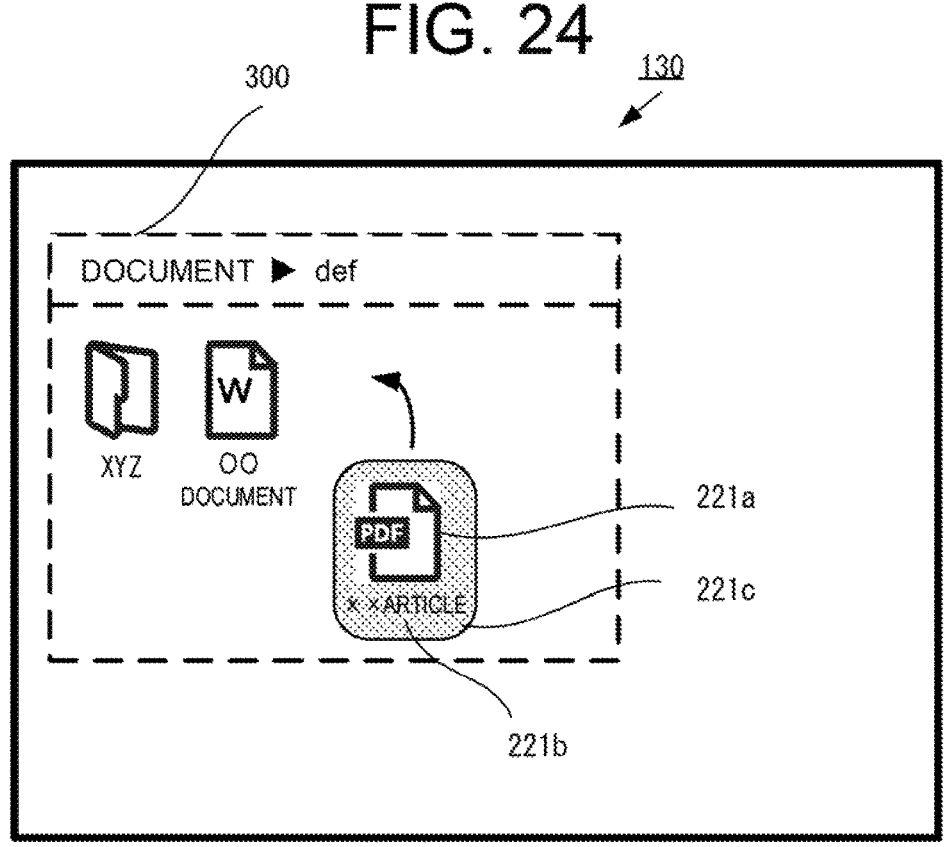
FIG. 24 is an explanatory diagram showing the second display area semi-transparently displayed on the display unit of the information processing device according to the third embodiment of the present invention to indicate that a transfer is not possible.

FIG. 22 is a flowchart showing a display process of an information processing device according to the third embodiment of the present invention. FIG. 23 is an explanatory diagram showing a not transferrable message near a transfer target file icon displayed on the display unit of the information processing device. FIG. 24 is an explanatory diagram showing the second display area semi-transparently displayed on the display unit of the information processing device to indicate that a transfer is not possible.

Overall Description

In the information processing device 10 of the third embodiment, if a transfer is not possible to a specified transfer destination, the display mode of the windows is changed to notify the user of this fact, or a message is displayed to this effect.

The functional configuration of the information processing device is the same as in the first embodiment shown in FIG. 1. Therefore, the description is omitted.

Display Process

Next, the display process of the third embodiment above will be described based on FIG. 22.

The display process of the third embodiment is substantially the same as the display process of the first embodiment shown in FIG. 2. Specifically, steps S31 to S36 and step S39 are the same as steps S11 to S16 and step S17. Therefore, the description is omitted.

When the user specifies a transfer destination in step S36, the data processor 102 determines whether or not the transfer is possible (step S37). If the transfer is possible, the process proceeds to step S39, and the transfer process is executed. If the transfer is not possible, the process proceeds to step S38, a message indicating that the transfer is not possible is displayed, and the display mode of the transfer destination display area is changed to a form that indicates that the transfer is not possible. The process then proceeds to step S39.

Display Mode Indicating Transfer Not Possible

Hereinafter, a display mode that indicates that a transfer to a transfer destination is not possible in step S38 will be described in detail.

As shown in FIG. 23, when transfer target data cannot be transferred to the transfer destination, a "not transferrable" message 270 is displayed.

Furthermore, as shown in FIG. 24, when the transfer target data cannot be transferred to the transfer destination, the window 300 representing the transfer destination is made semi-transparent, indicating that the transfer is not possible.

Although these displays are separately implemented in the above description, they may both be displayed simultaneously.

As a result, by notifying the user that the transfer to the transfer destination is not possible, the user can be notified of what has occurred and can be prompted for the next action.

Fourth Embodiment

Next, a fourth embodiment of the present invention will be described with reference to the drawings.

Figure 25:
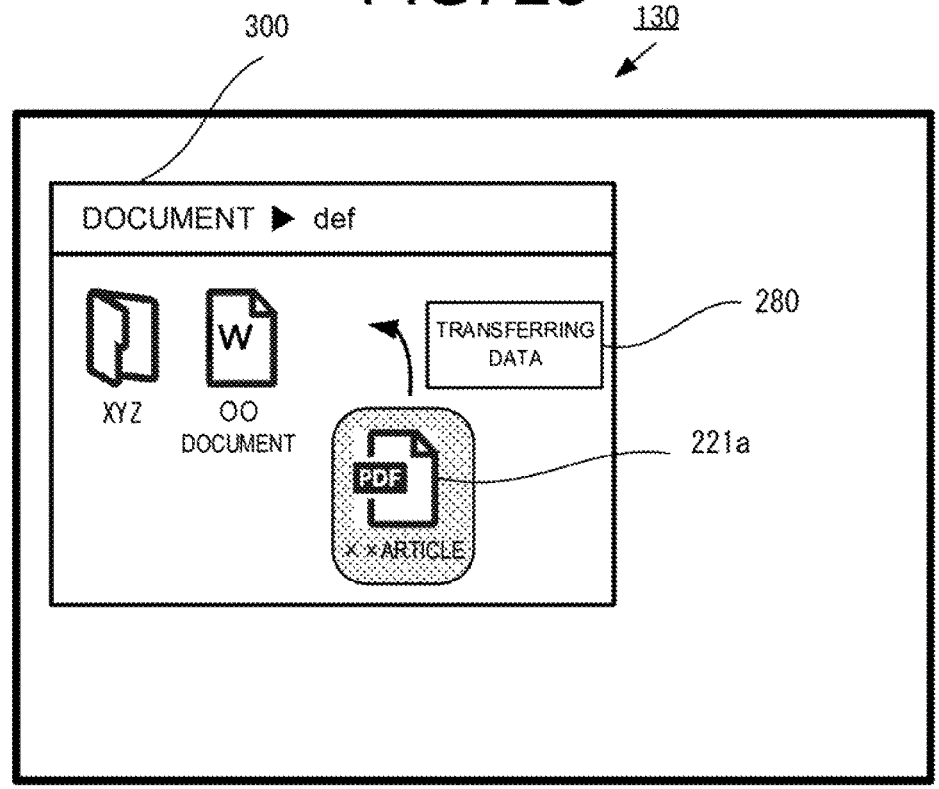
FIG. 25 is an explanatory diagram showing a case where a message indicating that transfer target data is currently in a transfer process is displayed on the display unit of an information processing device according to a fourth embodiment of the present invention.

FIG. 25 is an explanatory diagram showing a case where a message indicating that transfer target data is currently in a transfer process is displayed on the display unit of an information processing device according to the fourth embodiment of the present invention.

Overall Description

In the information processing device 10 of the fourth embodiment, when the user performs another operation during a transfer process of the transfer target data, a message is displayed which indicates that the data is currently in a transfer process.

The functional configuration of the information processing device is the same as in the first embodiment shown in FIG. 1. Therefore, the description is omitted.

Transferring Message Display

Hereinafter, the display of a transferring message display will be described in detail.

If the user performs another operation while a data transfer process is being performed in step S17 of FIG. 2, the display processor 101 displays a "data transferring" message 280 on the display unit 130.

As a result, the user is able to know the reason why the input operation cannot be executed, or why the processing of the operation is delayed, and will not perform any unnecessary operations.

Fifth Embodiment

Next, a fifth embodiment of the present invention will be described with reference to the drawings.

Figure 26:
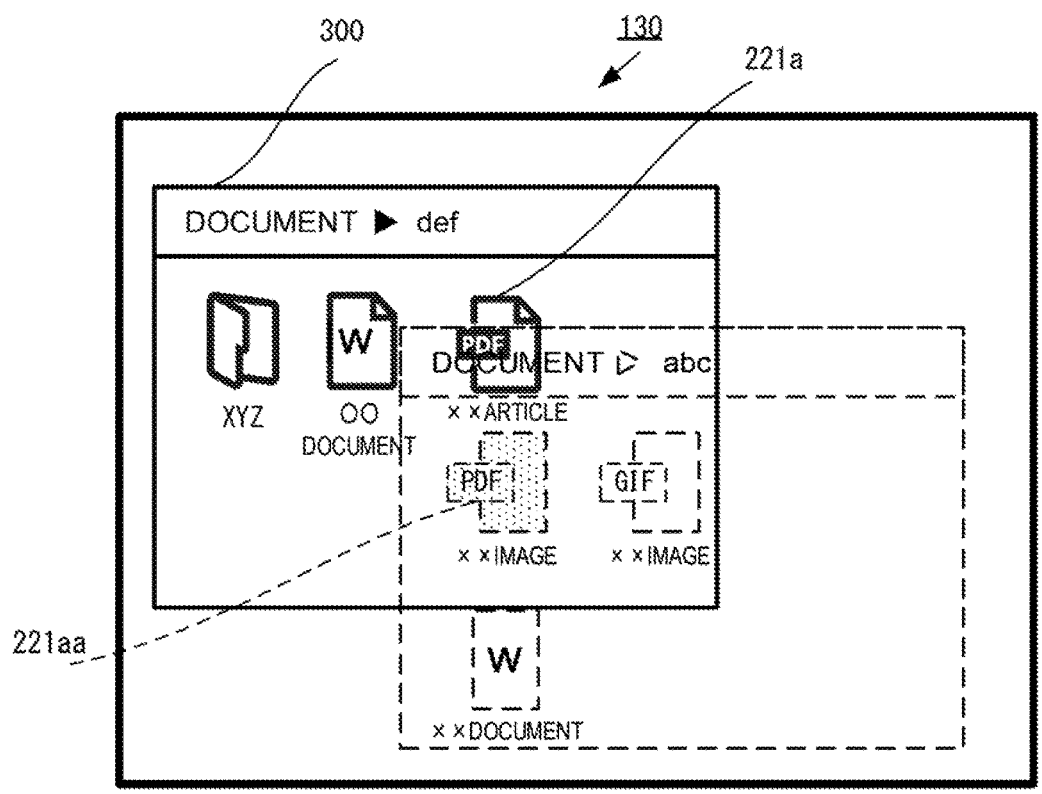
FIG. 26 is an explanatory diagram showing a case where a transfer target icon is displayed for a fixed time after a cut process in the first display area of the display unit of an information processing device according to a fifth embodiment of the present invention.

FIG. 26 is an explanatory diagram showing a case where a transfer target icon is displayed for a fixed time after a cut process in the first display area of the display unit of an information processing device according to the fifth embodiment of the present invention.

Overall Description

In the information processing device 10 of the fifth embodiment, the data display disappears from the first display area, which is the transfer source, after a cut process is executed. Therefore, in order to indicate the location of the transfer source, the display of the first display area is kept in a form which is different from the original display. Note that the display time is a prescribed time which is set in advance.

The functional configuration of the information processing device is the same as in the first embodiment shown in FIG. 1. Therefore, the description is omitted.

Transfer Target Icon Display in First Display Area During Cut Process

Hereinafter, the transfer target icon display in the first display area during a cut process will be described in detail.

When a cut process, which is a transfer process, is completed in step S17 of FIG. 2, it is assumed that the window 200 serving as the first display area is semi-transparently displayed as shown in FIG. 26. In the case of a cut process, the icon 221a, which is the transfer target, is moved from the window 200 to the window 300, which is the second display area, and is no longer displayed in the window 200.

However, user may sometimes want to confirm which display area the icon 221 used to be in when performing other operations. Therefore, the icon is displayed in the window 200 for a prescribed time set in advance. As shown in FIG. 26, an icon 221*aa* is semi-transparently displayed with other icons in the semi-transparently displayed window 200.

In this case, the color and transparency of the icon 221*aa* is different from the other icons to indicate that it is the transferred icon.

As a result, even in a case where a cut process has been performed with respect to transfer target data such as an icon, the data is displayed for a prescribed time in the first display area. Therefore, the user is capable of immediately confirming the location of the transfer source of the transfer target data.

Note that the embodiments above are examples for describing the present invention, and the technical scope of the invention described in the scope of the claims is not limited to the description above.

Furthermore, the program that operates in the information processing device according to the present invention may be a program that controls a CPU (Central Processing Unit) or the like (a program that causes a computer to function) so that the functions of the above embodiments relating to the present invention are realized. Further, the information handled by these devices is temporarily stored in a RAM (Random Access Memory) at the time of processing, and subsequently stored in various ROMs, such as a Flash ROM (Read Only Memory), or an HDD (Hard Disk Drive). Then, the information is read, corrected, and written as necessary by the CPU. Furthermore, a program for realizing the functions of each configuration may be recorded in a computer-readable recording medium, and the processing of each unit may be performed by a computer system reading and executing the program recorded on the recording medium. The "computer system" referred to here is assumed to include an OS and hardware such as a peripheral device.

Furthermore, the "computer-readable recording medium" refers to a portable medium such as a flexible disk, a magnetic optical disk, a ROM, or a CD-ROM, or a storage device such as a hard disk built into a computer system. Moreover, the program may be one capable of realizing some of the functions described above. Further, the functions described above may be realized in combination with a program already recorded in the computer system.

What is claimed is:

1. An information processing device including a processor capable of displaying a plurality of display areas when performing a data transfer, the plurality of display areas including a first display area showing a data transfer source, and a second display area showing a data transfer destination, wherein
the second display area is displayed such that the second display area is overlapped by the first display area;
the processor changes a display mode of the first display area when a transfer process is specified, and causes the second display area overlapped by the first display area to be displayed with priority;
the processor executes processing with respect to transfer target data displayed in the first display area based on specified transfer process when the second display area is specified as a transfer destination; and
the processor hides the first display area except for the transfer target data.

2. The information processing device according to claim 1, wherein the processor displays data displayed in the plurality of display areas as an icon.

3. The information processing device according to claim 2, wherein the processor changes the icon to a display mode indicating a transfer process when a transfer process is specified.

4. The information processing device according to claim 1, wherein the processor displays a name of the data displayed in the plurality of display areas.

5. The information processing device according to claim 1, wherein the processor changes a pointer to a display mode indicating a transfer process when a transfer process is specified.

6. The information processing device according to claim 1, wherein the processor changes at least one of the first display area and the second display area to a display mode indicating a transfer process.

7. The information processing device according to claim 1, wherein the processor displays a message to indicate that a transfer is not possible if the processor determines that a transfer to the second display area is not possible.

8. The information processing device according to claim 1, wherein the processor changes the display mode of the second display area to indicate that a transfer is not possible if the processor determines that a transfer to the second display area is not possible.

9. The information processing device according to claim 1, wherein the processor displays a message showing "data transferring" when an operation other than a transfer process is performed while a data transfer process is performed.

10. The information processing device according to claim 1, wherein the processor, in the case of a data cut process, displays the transfer target data in the first display area in a different mode to an original state for a prescribed time after process execution by the processor.

11. An information processing method capable of displaying a plurality of display areas when performing a data transfer, the plurality of display areas including a first display area showing a data transfer source, and a second display area showing a data transfer destination,
wherein the second display area is displayed such that the second display area is overlapped by the first display area,
the method comprising:
changing a display mode of the first display area when a transfer process is specified, and causing the second display area overlapped by the first display area to be displayed with priority;
executing processing with respect to transfer target data being displayed in the first display area on the basis of the specified transfer process when the second display area is specified as a transfer destination; and
the first display area is hided except for the transfer target data.

12. An information processing device including a processor capable of displaying a plurality of display areas when performing a data transfer, the plurality of display areas including a first display area showing a data transfer source, and a second display area showing a data transfer destination, wherein
the second display area is displayed such that the second display area is overlapped by the first display area;
the processor changes a display mode of the first display area when a transfer process is specified, and causes the second display area overlapped by the first display area to be displayed with priority;

the processor executes processing with respect to transfer target data displayed in the first display area based on specified transfer process when the second display area is specified as a transfer destination; and the processor semi-transparently displays the first display area except for the transfer target data.

* * * * *